United States Patent
Kobayashi

(10) Patent No.: US 9,891,798 B2
(45) Date of Patent: Feb. 13, 2018

(54) FACE IMAGE TRACKING SYSTEM

(71) Applicant: TOSHIBA TEC KABUSHIKI KAISHA, Tokyo (JP)

(72) Inventor: Tohru Kobayashi, Numazu Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 222 days.

(21) Appl. No.: 14/796,622

(22) Filed: Jul. 10, 2015

(65) Prior Publication Data

US 2016/0019417 A1    Jan. 21, 2016

(30) Foreign Application Priority Data

Jul. 15, 2014  (JP) ................. 2014-145207

(51) Int. Cl.
   *G06K 9/00*    (2006.01)
   *G06F 3/0484*  (2013.01)

(52) U.S. Cl.
   CPC ..... *G06F 3/04842* (2013.01); *G06K 9/00295* (2013.01); *G06K 9/00926* (2013.01)

(58) Field of Classification Search
   None
   See application file for complete search history.

(56) References Cited

U.S. PATENT DOCUMENTS

| | | | |
|---|---|---|---|
| 6,381,346 B1* | 4/2002 | Eraslan | G06K 9/00221 345/420 |
| 6,654,047 B2 | 11/2003 | Iizaka | |
| 6,924,741 B2* | 8/2005 | Tamayama | G06F 17/30017 340/572.1 |
| 7,551,755 B1* | 6/2009 | Steinberg | G06K 9/00228 340/5.53 |
| 7,555,148 B1* | 6/2009 | Steinberg | G06F 17/30247 340/5.53 |
| 7,558,408 B1* | 7/2009 | Steinberg | G06K 9/00288 340/5.53 |
| 8,311,341 B1* | 11/2012 | Podilchuk | G06K 9/6201 382/209 |
| 8,782,052 B2* | 7/2014 | Park | G06F 17/30265 707/737 |
| 9,250,834 B2* | 2/2016 | Grodsky | G06F 3/1206 |
| 9,633,272 B2* | 4/2017 | Zhong | G06K 9/036 |
| 2003/0113004 A1* | 6/2003 | Kim | G06T 7/0012 382/128 |
| 2009/0237719 A1* | 9/2009 | Miura | G06F 3/1204 358/1.15 |

(Continued)

FOREIGN PATENT DOCUMENTS

JP    2000200357 A    7/2000

*Primary Examiner* — Iman K Kholdebarin
(74) *Attorney, Agent, or Firm* — Patterson & Sheridan, LLP

(57) ABSTRACT

A face image tracking system for a site includes a storage unit storing face images of persons that were acquired when the persons visited the site, an imaging unit configured to capture a face image of a person when the person requests deletion of a face image of the person stored in the storage unit, and a processing unit configured to extract one or more stored face images that have at least a threshold similarity to the face image of the person captured by the imaging unit, and delete one of the extracted face images from the storage unit.

20 Claims, 10 Drawing Sheets

(56) References Cited

U.S. PATENT DOCUMENTS

| | | | | |
|---|---|---|---|---|
| 2010/0322522 A1* | 12/2010 | Wang | ............... | G06K 9/00704 |
| | | | | 382/218 |
| 2012/0213420 A1* | 8/2012 | Steiner | ............... | G06K 9/00295 |
| | | | | 382/118 |
| 2014/0201126 A1* | 7/2014 | Zadeh | ............... | G06N 7/005 |
| | | | | 706/52 |
| 2015/0033362 A1* | 1/2015 | Mau | ............... | G06K 9/00288 |
| | | | | 726/27 |

* cited by examiner

FIG. 5

| SPECIFIC PERSON | EYES | NOSE | MOUTH | CHIN |
|---|---|---|---|---|
| TP1 | | | | |
| TP2 | | | | |
| ⋮ | ⋮ | ⋮ | ⋮ | ⋮ |

FACE IMAGE TRACKING SYSTEM

CROSS-REFERENCE TO RELATED APPLICATION

This application is based upon and claims the benefit of priority from Japanese Patent Application No. 2014-145207, filed Jul. 15, 2014, the entire contents of which are incorporated herein by reference.

FIELD

An embodiment described herein relates generally to a face image tracking system.

BACKGROUND

A security system in a store such as a department store or a supermarket identifies and tracks a face of a customer passing in the store using a camera located in the store. In addition, the security system can be used to analyze a traffic pattern of customers in the store by compiling tracking information in a database.

In some cases, a customer may request the store to erase the captured image of the customer. In such a case, a staff of the store searches the image of the customer in a database containing many images using the time when the customer visited the store and paths where the customer walked through, as search keys. For this reason, it may take a lot of time and operation for the store to delete the image of the customer.

DESCRIPTION OF THE DRAWINGS

FIGS. 3-5 each illustrate a data configuration of data stored in a memory region of the store computer.

DETAILED DESCRIPTION

An embodiment provides a face tracking system with which a store staff may efficiently delete the image of a customer who requests deletion of his or her image from the database.

In general, according to an embodiment, a face image tracking system for a site includes a storage unit storing face images of persons that were acquired when the persons visited the site, an imaging unit configured to capture a face image of a person when the person requests deletion of a face image of the person stored in the storage unit, and a processing unit configured to extract one or more stored face images that have at least a threshold similarity to the face image of the person captured by the imaging unit, and delete one of the extracted face images from the storage unit.

Hereinafter, a face tracking device and a program according to an embodiment will be described in detail with reference to FIG. 1 to FIG. 12. In the embodiment described below, a store computer (SC) provided in a store such as a department store or a supermarket is described as an example of the face tracking device. However, the present disclosure is not limited to the embodiment below.

Figure 1:
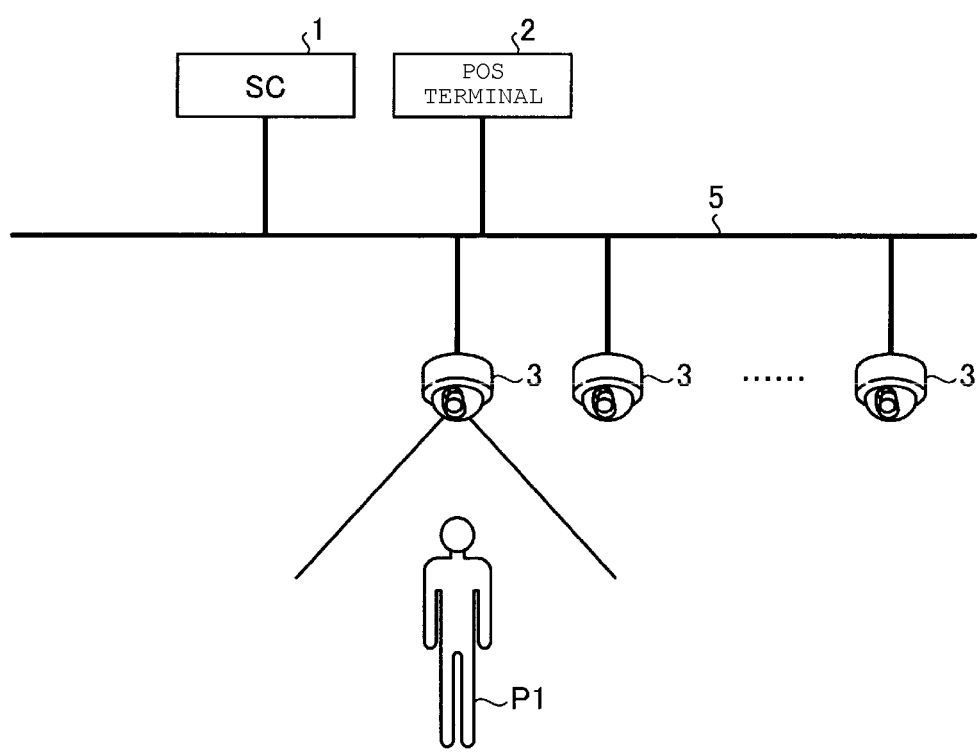
FIG. 1 illustrates a connection relationship among each device in a face tracking system according to an embodiment.

FIG. 1 schematically illustrates a connection relationship among each device of a face tracking system according to the present embodiment. In FIG. 1, the face tracking system includes a store computer (SC) 1, a point of sales (POS) terminal 2, and a plurality of cameras 3. These devices are connected to each other via a communication line 5 such as a local area network (LAN).

The POS terminal 2 executes sales registering with regard to merchandise purchased by a customer in the store. In addition, the POS terminal 2 generates merchandise sales registration information for the merchandise for which the sales registering is executed, and transmits the information to the SC 1 via the communication line 5.

The SC 1 collects and manages sales information of the merchandise that is processed to be sold in the POS terminal 2. In addition, the SC 1 stores merchandise information such as a price or a name of the merchandise sold in the store. In addition, the SC 1 receives and stores images captured by the cameras 3 to track and manage persons in the store.

Generally, an operator of the store captures the images inside the store using the cameras 3 without obtaining consent from the persons in the store in advance. For this reason, some of the persons whose images are captured by the cameras 3 may be aware that his or her images are captured, and request to erase the image from data recorded in the store. If there is a request to delete the image, the operator of the store extracts and deletes the relevant image from the images captured by the cameras 3.

A plurality of cameras 3 are provided, for example, on the ceiling near the path at a constant interval along the path so as to be capable to capture images of the persons passing through the path. Specifically, the cameras 3 are located and directed such that the camera may capture front image of the persons passing through the path. In addition, the cameras 3 tracks the persons passing the path until the persons leave the store (get out of the entrance). In the present embodiment, n numbers of cameras 3 are provided along the path in the store and those cameras 3 capture images of a person P1 passing through a path in the store.

Figure 2:
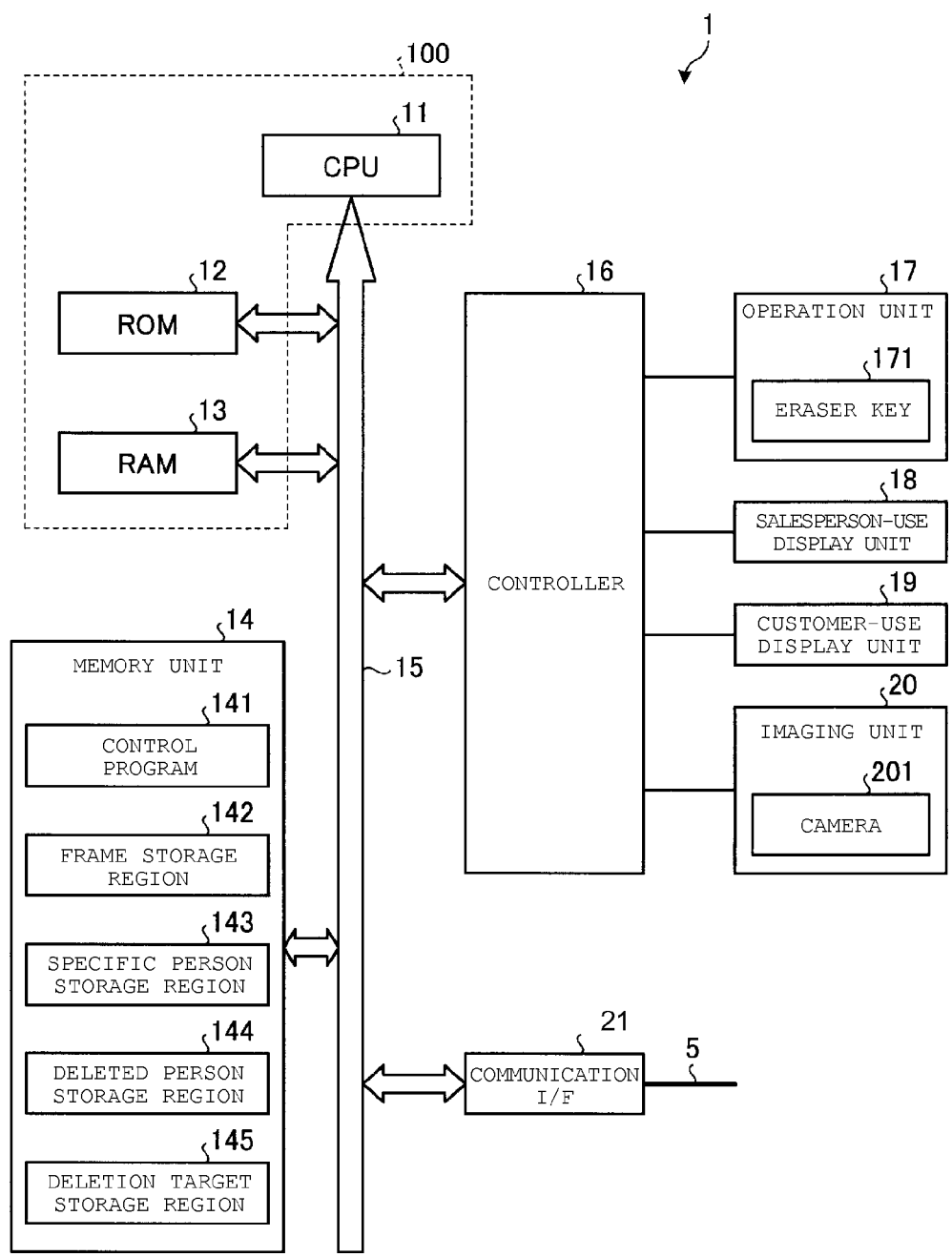
FIG. 2 is a block diagram of a store computer in the face tracking system.

FIG. 2 is a block diagram of the SC 1. In FIG. 2, the SC 1 includes a central processing unit (CPU) 11 that mainly controls the SC, read only memory (ROM) 12 in which various programs are stored, random access memory (RAM) 13 in which various data are developed, and a memory unit 14 in which various programs are stored. The CPU 11, ROM 12, RAM 13, and the memory unit 14 are connected to each other via a data bus 15. The CPU 11, ROM 12, and RAM 13 configure the control unit 100. That is, the control unit 100 executes the controlling described below by the CPU 11 operating according to a control program 141 stored in the ROM 12 and the memory unit 14 and developed in the RAM 13.

In addition to developing various programs including the control program 141, the RAM 13 temporarily stores the images captured by the cameras 3 before storing in the memory unit 14.

The memory unit 14 is a non-volatile memory unit such as a hard disc drive (HDD) or a flash memory in which the stored information is maintained even if the power is OFF, and stores programs including the control program 141. The memory unit 14 includes a frame storage region 142, a specific person storage region 143, a deleted person storage region 144, and a deletion target storage region 145. The frame storage region 142 receives the image captured by the cameras 3 and stores the image on a frame basis when the image includes a human face. The specific person storage region 143 stores images of face parts of a specific person, for example, who is currently wanted by police, and can detect an image of a person that matches the stored images of the specific person. The deleted person storage region 144 stores a face image of a person who requested to erase the image captured by the cameras 3. The deletion target storage region 145 stores an image of the deletion target. The frame means a unit of the images.

In addition, an operation unit 17, a salesperson-use display unit 18, a customer-use display unit 19, and an imaging unit 20 are connected to the data bus 15 via a controller 16.

The operation unit 17 includes a numeric keypad with which numeric digits can be input and various function keys. The operation unit 17 includes an erase key 171 for starting an erasing operation of the images captured by the cameras 3.

A display screen of the salesperson-use display unit 18 is directed toward a salesperson. The salesperson-use display unit 18 displays in-store images sent from the cameras 3 in addition to various kinds of information. That is, the salesperson-use display unit 18 displays the images captured by the cameras 3. The salesperson-use display unit 18 displays the image of the person who requested the deletion, which is extracted from the in-store images captured by the cameras 3.

A display screen of the customer-use display unit 19 is directed toward a customer. The customer-use display unit 19 displays the image of the person who requested the deletion, in addition to various kinds of information. The customer-use display unit 19 displays the image of the person who requested the deletion which is extracted from the in-store images captured by the cameras 3.

The imaging unit 20 has an imaging function including a camera 201 that captures a face image of a person who requests the deletion of the captured image of the person. The camera 201 is directed toward the person on the position where the person is standing so as to be capable of capturing the substantially front face image of the person who requests the deletion of the captured image of himself. The imaging unit 20 transmits the face image captured by the camera 201 to the controller 16.

The data bus 15 is connected to a communication interface (I/F) 21 such as a LAN I/F. The communication I/F 21 is connected to the communication line 5. The communication I/F 21 receives the images captured by the cameras 3 through the communication line 5.

Figure 3:
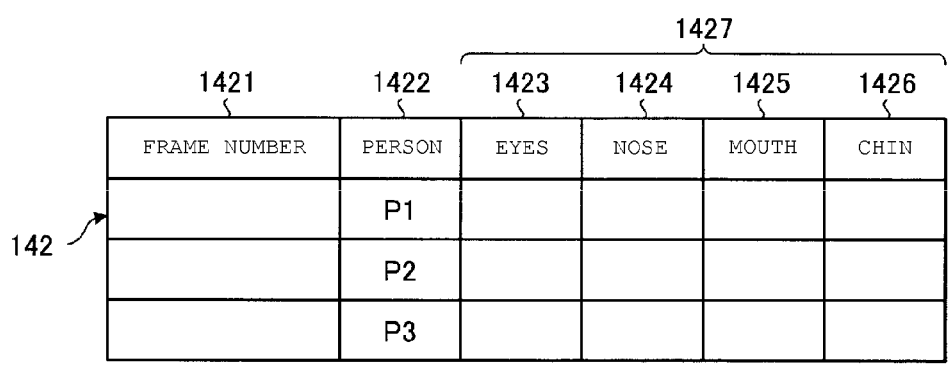

FIG. 3 illustrates a data configuration of data stored in the frame storage region 142. The frame storage region 142 stores images of each face part of a person, which is captured by the cameras 3, with respect to each person.

A face recognition technology is a known technology for identifying a face of a person. The an image that is determined to include a face is divided into images of face parts such as eyes, nose, mouth, and a chin, and then, the characteristics of each face part of the recognized face are determined based on stored images of each face part. Then, stored face images that match the image of the person is determined. The face parts to be used may not be all of eyes, nose, mouth, and chin as long as some of the face parts are sufficient to identify a human face. In addition, other face parts may be used in addition to eyes, nose, mouth, and chin. Furthermore, the face parts are not limited to eyes, nose, mouth, and chin, but, any other parts may be used.

In FIG. 3, the frame storage region 142 includes a frame number column 1421, a person column 1422, an eye column 1423, a nose column 1424, a mouth column 1425, and a chin column 1426. The frame number column 1421 stores a frame number of a frame image. The frame number is automatically assigned to each of the frame images. The person column 1422 stores the image of a person who is included in the input image and reflected in that image, with respect to each person. In the example in FIG. 3, faces of three persons P1, P2, and P3 are stored. The eye column 1423, the nose column 1424, the mouth column 1425, and the chin column 1426 are collectively referred to as face parts columns 1427.

The eye column 1423 stores images of eyes extracted from the images of persons. The nose column 1424 stores images of noses extracted from the images of the persons. The mouth column 1425 stores images of mouths extracted from the image of the persons. The chin column 1426 stores images of chins extracted from images of the persons. For example, the control unit 100 of the SC 1 analyzes face characteristics of the person P1 by analyzing characteristics of the eyes, nose, mouth, and chin, based on images of face parts stored in correlation with the person P1. Similarly, the control unit 100 analyzes face characteristics of the person P2 and the person P3. In this way, control unit 100 analyzes the face of each person.

The control unit 100, with respect to each frame image input through the communication I/F 21, compares characteristics of each face part of a face recognized in the frame image with characteristics of each face part stored in the face parts columns 1427 of the frame storage region 142. If the face in the frame image and the face stored in the storage region 142 are determined to be the same, the control unit 100 determines which face is facing toward the front side more than the other. Then, the control unit 100 selects a front face image which is determined to be facing toward the front side and stores the selected image in the frame storage region 142. That is, the frame storage region 142 stores the image which is more facing toward the front side among the images of the same person. If the successive input of images of the same person is once interrupted, in some cases, the control unit 100 may erroneously determine that the image of the same person input thereafter is an image of another person.

Figure 4:
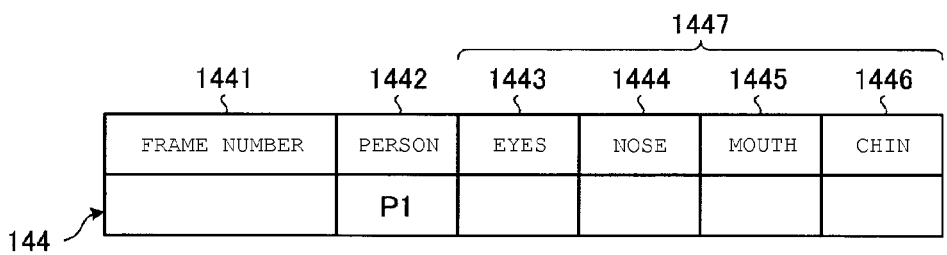

FIG. 4 illustrates a data configuration of data stored in the deleted person storage region 144. The deleted person storage region 144 stores a face image of a person who requests to delete the face image of his own captured by the imaging unit 20. The deleted person storage region 144 includes a frame number column 1441, a person column 1442, an eye column 1443, a nose column 1444, a mouth column 1445, and a chin column 1446. Similar to the frame storage region 142, the frame number column 1441 stores a frame number of a frame image. The person column 1442 stores an image of a person. The eye column 1443 stores image information of eyes of the person. The nose column 1444 stores image information of a nose of the person. The mouth column 1445 stores image information of a mouth of the person. The chin column 1446 stores image information of a chin of the person. The eye column 1443, the nose column 1444, the mouth column 1445, and the chin column 1446 are collectively referred to as a face parts column 1447.

Figure 5:
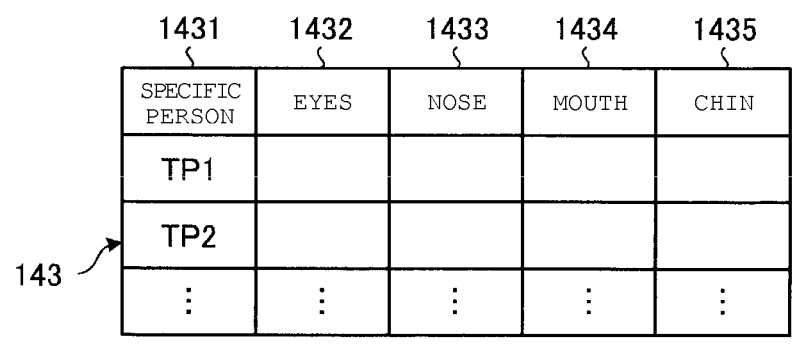

FIG. 5 illustrates a data structure of data stored in the specific person storage region 143. The specific person storage region 143 stores images of face parts of a specific person and the face characteristics of the specific person. The specific person means, for example, a person who has done a shoplifting or damaged products for sale in the store or the store itself or is currently wanted by police. If a specific person comes to the store, the operator of the store may need to pay attention in monitoring that specific person through the images captured by the cameras 3.

In FIG. 5, the specific person storage region 143 includes a specific person column 1431, an eye column 1432, a nose column 1433, a mouth column 1434, and a chin column 1435. The specific person column 1431 stores personal information such as a name, an age, and a gender of the specific person. The eye column 1432 stores image information of the eyes of the specific person. The nose column 1433 stores image information of the nose of the specific person. The mouth column 1434 stores image information of the mouth of the specific person. The chin column 1435 stores image information of the chin of the specific person. For example, the control unit 100 of the SC 1 determines that a person is the specific person TP1 based on the frame image of the person and image information of the eyes, nose, mouth, and chin stored in the eyes column 1432, the nose column 1433, the mouth column 1434, and the chin column 1435.

Figure 6:
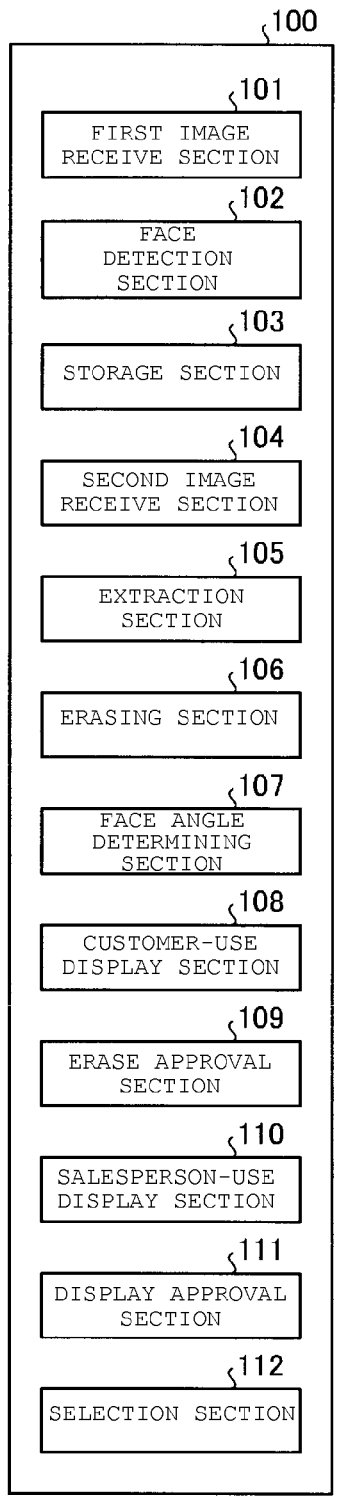
FIG. 6 is a block diagram of functional sections generated in a control unit of the store computer.

Subsequently, the control operation carried out by the SC 1 will be described with reference to FIG. 6 to FIG. 12. FIG. 6 is a block diagram illustrating a functional configuration of the SC 1. The control unit 100 functions as a first image receive section 101, a face detection section 102, a storage section 103, a second image receive section 104, an extraction section 105, an erasing section 106, a face angle determination section 107, a customer-use display section 108, an erase approval section 109, a salesperson-use display section 110, a display approval section 111, and a selection section 112 according to various programs including the control program 141 stored in the ROM 12 or the memory unit 14.

The first image receive section 101 has a function of receiving the images captured by the cameras 3.

The face detection section 102 has a function of detecting a face of a person included in the image received by the first image receive section 101.

The storage section 103 has a function of storing the face image of the person, in the frame storage unit 142.

The second image receive section 104 has a function of receiving the images captured by the camera 201 in response to a face image erase request operation.

The extraction section 105 has a function of extracting the face image having a high similarity to the face image of the face of the image received by the second image receive section 104, from the frame storage unit 142.

The erasing section 106 has a function of erasing the extracted face image from the frame storage unit 142.

The face angle determination section 107 has a function of determining an angle of the faces in the images received by the first and second image receive sections 101 and 104.

The customer-use display section 108 has a function of displaying the extracted face image on the customer-use display unit 19.

The erase approval section 109 has a function of approving the erasing of the displayed face image.

The salesperson-use display section 110 has a function of displaying the extracted face image on the salesperson-use display unit 18.

The display approval section 111 has a function of approving the displaying of the face image displayed on the salesperson-use display unit 18 on the customer-use display unit 19.

The selection section 112 has a function of selecting the face image to be displayed on the customer-use display unit 19 from the face images displayed on the salesperson-use display unit 18.

Figure 7:
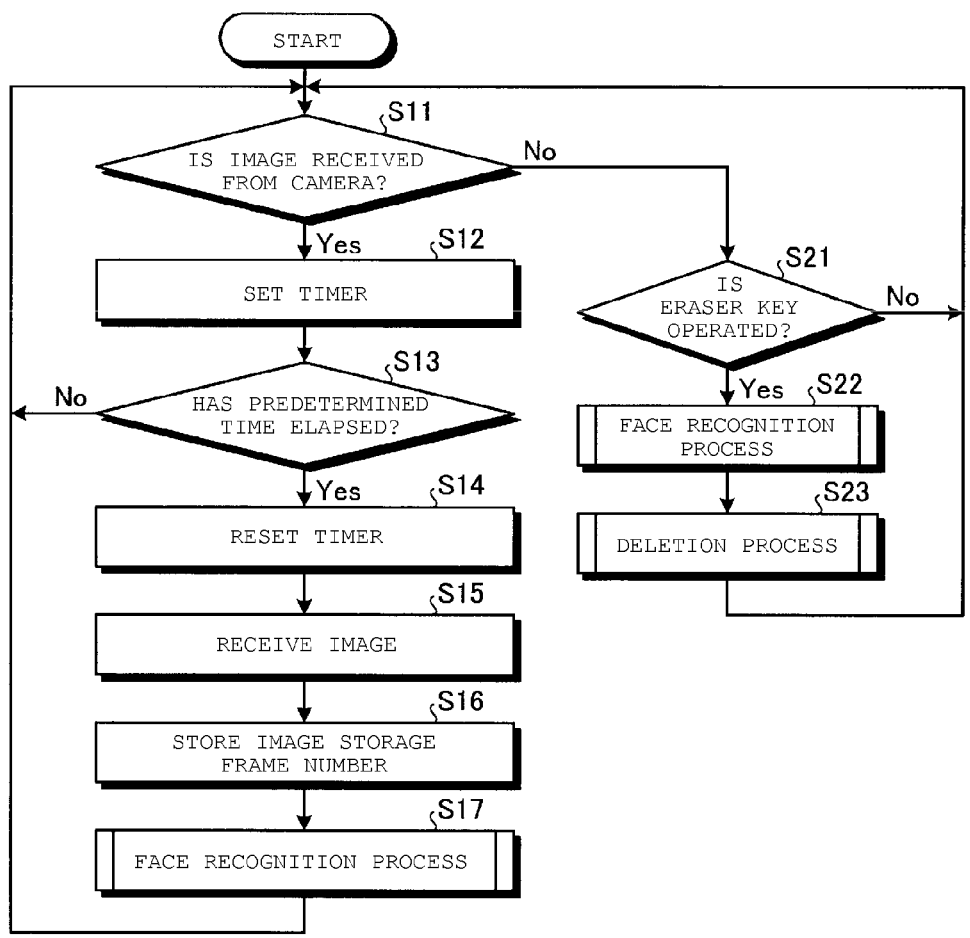
FIG. 7 is a flowchart illustrating a control operation carried out by the store computer.

FIG. 7 is a flowchart illustrating an overall flow of the control operations carried out by the SC 1. The control unit 100 executes the control operations below based on the input image information.

In FIG. 7, the control unit 100 determines whether or not the image captured by the cameras 3 is received by the communication I/F 21 (STEP S11). If the captured image is determined to be received (Yes in STEP S11), the control unit 100 sets a timer (STEP S12).

Next, the control unit 100 determines whether or not the set timer indicates that the predetermined time has elapsed (for example, 500 ms) (STEP S13). If it is determined that the timer indicates that the predetermined time has elapsed (Yes in STEP S13), the control unit 100 resets the timer set in STEP S12 (STEP S14). Then, the control unit 100 (the first image receive section 101) receives the captured image received by the communication I/F 21 (STEP S15). Then, the control unit 100 stores the captured image in the person column 1422 of the frame storage region 142 (STEP S16). When storing the captured image, the control unit 100 assigns a unique frame number that specifies the captured image and stores the assigned frame number in the frame number column 1421 (STEP S16).

Figure 8:
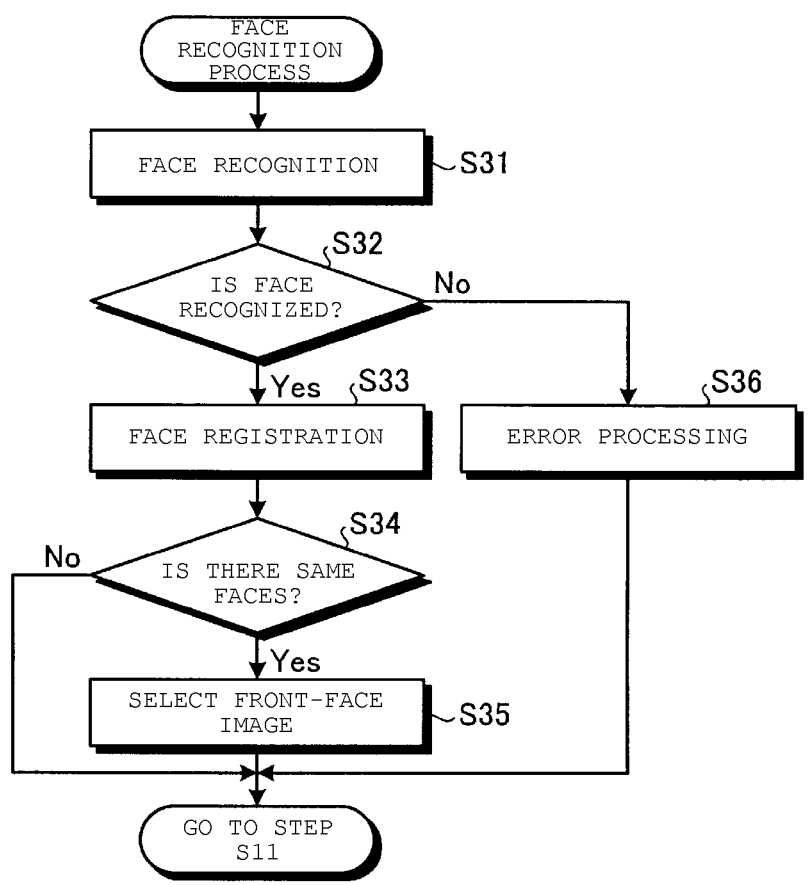
FIG. 8 is a flowchart illustrating a face recognition process carried out in the control operation in FIG. 7.

Then, the control unit 100 executes a face recognition process illustrated in FIG. 8 (STEP S17). In FIG. 8, the control unit 100 performs the face recognition by analyzing the presence or absence of the parts such as eyes, nose, mouth, and chin in the captured image stored in the person column 1422 (STEP S31). Then, the control unit 100 determines whether or not the face is included in the captured image (STEP S32). If the face is determined to be included (Yes in STEP S32), the control unit 100 (face detection section 102) stores (registers) the image information of each face part in the face parts column 1427 of the frame storage region 142 (STEP S33).

Then, the control unit 100 determines whether or not the face images stored in the face parts column 1427 of the frame storage region 142 include a face image that is the same as the face image of the captured frame image (STEP S34). If it is determined that there is the face image same as the face image of the captured frame image (Yes in STEP S34), the control unit 100 (storage section 103 and face angle determination section 107) compares two face images and selects the face image which faces towards a front direction more than the other, and then, stores the images of the face parts thereof in the face parts columns 1427 (STEP S35). That is, the face parts columns 1427 store image data of the face parts of the face that faces in the front direction more than the other. If it is determined that there is no face image same as the face image of the captured frame image (No in STEP S34), the control unit 100 stores image data of the face parts of the captured frame image in the face parts columns 1427. Then, the process by the control unit 100 returns to STEP S11.

If the face is determined to be not included in the captured image (No in STEP S32), the control unit 100 displays an error message on the salesperson-use display unit 18 indicating that the face is not detected (STEP S36). After STEP S35 and STEP S36, the process by the control unit 100 returns to STEP S11.

On the other hand, if the image is determined to be received by the communication I/F 21 (No in STEP S11), the control unit 100 determines whether or not the erase key 171 is operated (STEP S21). If the erase key 171 is determined to be operated (Yes in STEP S21), the control unit 100 executes face recognition illustrated in FIG. 9 (STEP S22), and thereafter, executes the deletion illustrated in FIG. 10 (STEP S23). Then, the process by the control unit 100 returns to STEP S11. In STEP S13, if the predetermined time is determined to not have elapsed (No in STEP S13), or if the erase key 171 is determined to be not operated in STEP S21 (No in STEP S21), the process by the control unit 100 returns to STEP S11.

Figure 9:
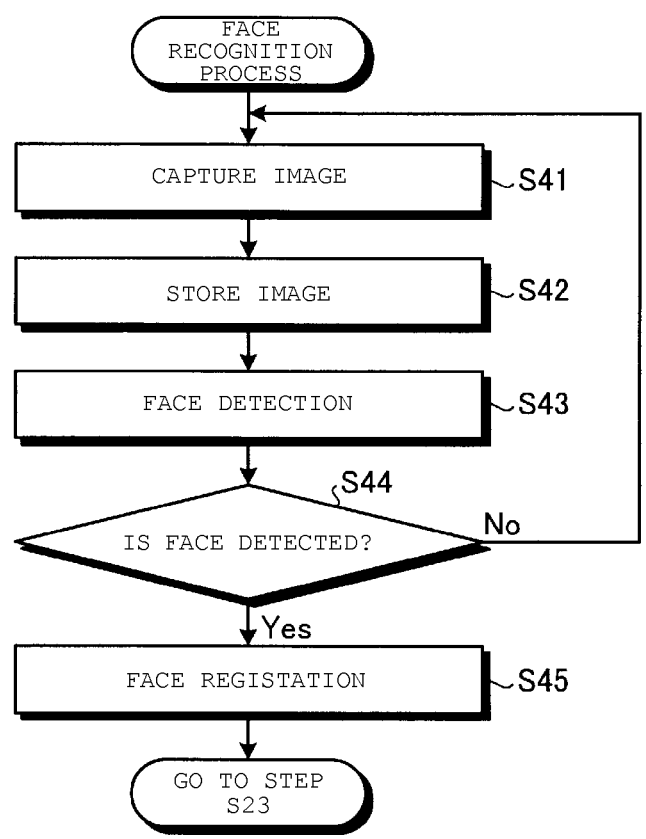
FIG. 9 is a flowchart illustrating another face recognition process carried out in the control operation in FIG. 7.

Next, the face recognition in STEP S22 will be described with reference to the flowchart in FIG. 9. FIG. 9 is a flowchart of the processing carried out by the control unit 100 to capture a face image of a person who requests deletion of his or her face images and delete the face images captured by the cameras 3 and stored when the erase key 171 is operated.

Referring to FIG. 9, the control unit 100 captures the image of the person who requested the deletion of the image by controlling the imaging unit 20 (STEP S41). Then, the control unit 100 (second image receive section 104) receives the captured image of the person and stores the image in the person column 1442 of the deleted person storage region 144 (STEP S42). Then, the control unit 100 executes the face recognition based on the image stored in the person column 1442 (STEP S43). Then, the control unit 100 determines whether or not the face recognition is possible (STEP S44). Next, if the face recognition is determined to be possible (Yes in STEP S44), the control unit 100 extracts images of the face parts of the face (eyes, nose, mouth, and chin) with regard to the face image of which the face recognition is possible and stores the images of the face parts in the face parts columns 1447 (STEP S45). Then, the process proceeds to STEP S23. If the face recognition is determined to be not possible (No in STEP S44), the process returns to STEP S41, and the control unit 100 attempts to capture the face image again.

Figure 10:
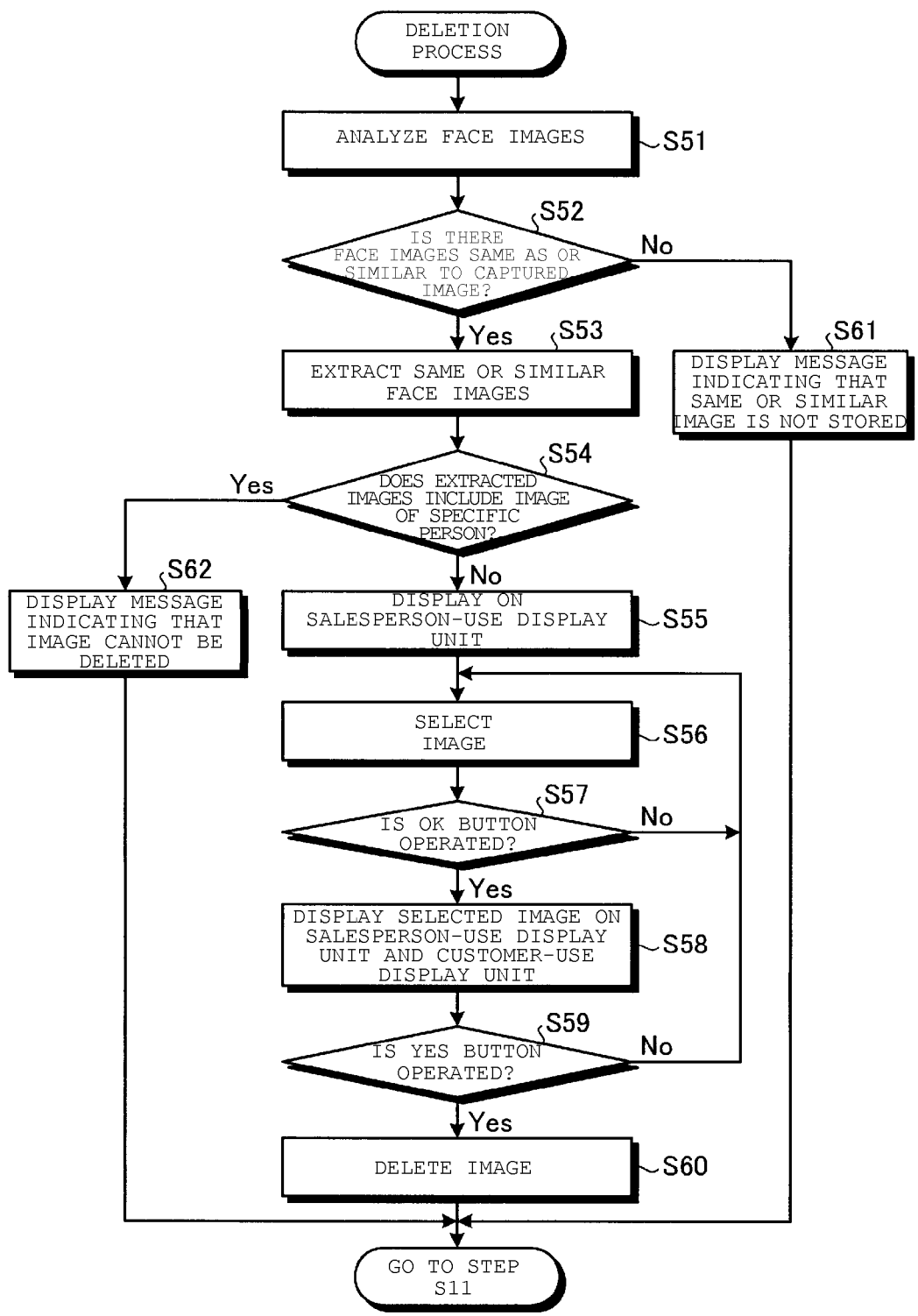
FIG. 10 is a flowchart illustrating a deletion process carried out in the control operation in FIG. 7.

Next, the deletion executed in STEP S23 based on the face image stored in STEP S22 will be described with reference to FIG. 10. In FIG. 10, the control unit 100 searches the images of the face parts stored in the face parts columns 1427 of the frame storage region 142 (STEP S51). Then, the control unit 100 determines whether or not the images stored in the face parts columns 1427 includes an image same as (or highly similar to) the image of the face parts stored in the face parts column 1447 of the deleted person storage region 144 (STEP S52). If the images stored in the face parts columns 1427 includes the images same as the image stored in the face parts columns 1447 (Yes in STEP S52), the control unit 100 (the extraction section 105) extracts all of the face images that are determined to be the same or highly similar, and stores the extracted face images in the deletion target storage region 145 (STEP S53).

Next, the control unit 100 determines whether or not the face image that matches the face images stored in STEP S53 is included in the face images of the specific persons stored in the specific person storage region 143 (STEP S54). Alternatively, the control unit 100 determines whether or not the face image that matches the face image of the person who requested the deletion and stored in STEP S45 is included in the face images of the specific persons stored in the specific person storage region 143 (STEP S54). If the matching face image exists (Yes in STEP S54), since the person of the face image stored in STEP S53 or the person of the face image stored in STEP S45 may be a person who is on a black list or is currently wanted by the police, the control unit 100 executes an error processing instead of the deletion of the image (STEP S62). In addition, a message indicating that the image of the person cannot be deleted is displayed on the salesperson-use display unit 18 (STEP S62). Then, the process by the control unit 100 returns to STEP S11.

Figure 11:
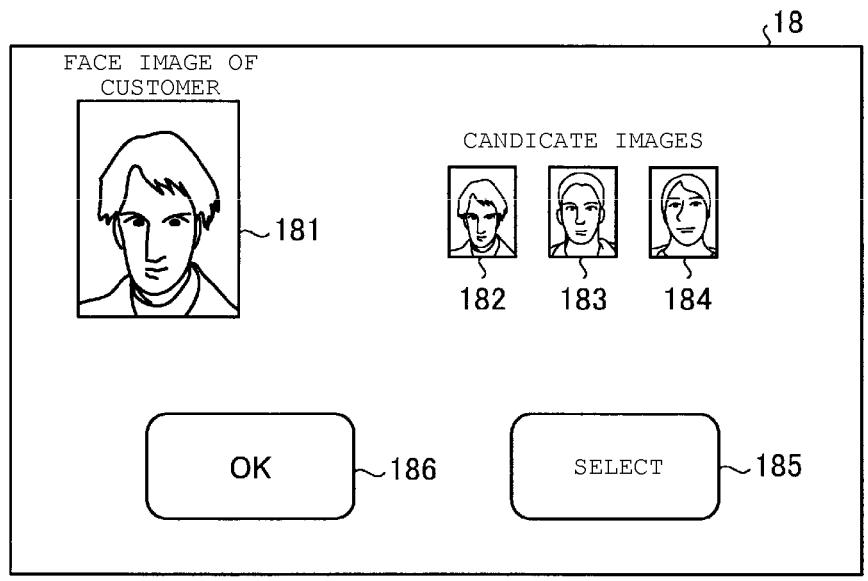
FIG. 11 illustrates a screen example displayed on a salesperson-use display unit of the store computer.

On the other hand, if the face image is determined to not match the face images of the specific persons stored in the specific person storage region 143 (No in STEP S54), the control unit 100 (salesperson-use display section 110) displays the face image stored in the deletion target storage region 145 in STEP S53 on the salesperson-use display unit 18 (STEP S55). An example of face image displayed on the salesperson-use display unit 18 is illustrated in FIG. 11. In FIG. 11, the control unit 100 displays a face image 181 stored in STEP S45, face images 182, 183, and 184 stored in STEP S53 on the salesperson-use display unit 18. In addition, the control unit 100 displays a selection button 185 and an OK button 186. The salesperson looks at the displayed face images 182, 183, and 184, selects the face image which appears to be same face as the face in the face image 181, and operates the selection button 185. The control unit 100 then determines the selected face image to include a face same as the face in the face image 181. Then, the salesperson completes the selection process by operating the OK button 186.

The control unit 100 (selection section 112) selects the face image on which the selection operation is performed by the salesperson (STEP S56). Then, the control unit 100 (display approval section 111) determines whether or not the OK button 186 is operated by the salesperson (STEP S57). Until the OK button 186 is operated, the face image is regarded as being selectable (No in STEP S57). If the OK button 186 is determined to be operated (Yes in STEP S57), the control unit 100 (customer-use display section 108) displays the face image 181 stored in STEP S45 and the image selected by the salesperson on the salesperson-use display unit 18 and the customer-use display unit 19 (STEP S58).

Figure 12:
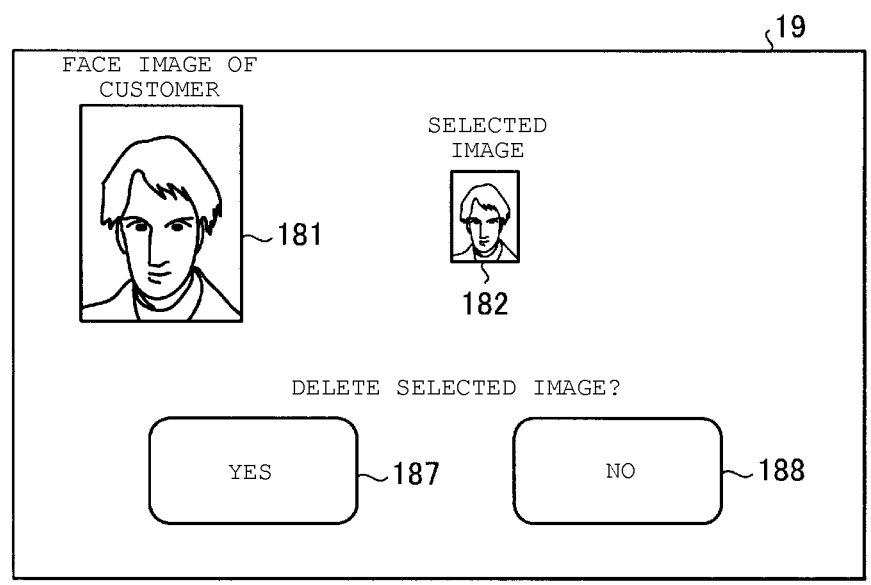
FIG. 12 illustrates a screen example displayed on a customer-use display unit of the store computer.

FIG. 12 is an example of a screen illustrating the face image displayed on the customer-use display unit 19 in STEP S58. In FIG. 12, the control unit 100 displays the face image 181 stored in STEP S45 and a face image 182 which is selected in STEP S56, on the customer-use display unit 19. In addition, the control unit 100 displays YES button 187 and a NO button 188. The person who has requested the deletion looks at this screen and checks whether or not the image displayed on the customer-use display unit 19 is a face image of the person. Then, if the displayed face image is determined to be the face image of the person, the person operates the YES button 187. On the other hand, if the displayed face image is determined to be not the face image of the person, the person operates the NO button 188.

The control unit 100 (erase approval section 109) determines whether or not the YES button 187 is operated (STEP S59). If the YES button 187 is determined to be operated (Yes in STEP S59), the control unit 100 (erasing section 106) deletes the face image information displayed on the customer-use display unit 19 from the frame storage region 142, the deleted person storage region 144, and the deletion target storage region 145 (STEP S60). On the other hand, if the NO button 188 is determined to be operated (No in STEP S59), the process returns to STEP S56, and the control unit 100 displays the face image displayed on the customer-use display unit 19 again on the salesperson-use display unit 18, and performs the selection operation again.

In STEP S52, the face images stored in the face parts columns 1427 are determined to not include an image same as (or highly similar to) the image of the face parts stored in the face parts column 1447 (No in STEP S52), the control unit 100 displays a message indicating that the same face is not stored, on the salesperson-use display unit 18 (STEP S61).

According to the present embodiment, if the person whose face image is captured and recorded by the store requests to delete the captured image, the control unit 100 extracts and deletes the image of the person. Therefore, salesperson working in the store may extract and delete the image with a few operations.

In addition, according to the present embodiment, the control unit 100 causes the extracted image to be displayed on the customer-use display unit 19, and if the person who requested the deletion of the face image operates the check button, the image is deleted. Therefore, when the person who has requested the deletion of his own face image operates the YES button 187 by himself, the control unit 100 deletes the face image of the person.

In addition, according to the present embodiment, the control unit 100 once displays the extracted image on the salesperson-use display unit 18, and after the salesperson checks the extracted face image, displays the face image on the customer-use display unit 19. Therefore, the salesperson may check in advance whether or not the face image of another person is included in the extracted face images.

In addition, according to the present embodiment, the control unit 100 eliminates the image which is not to be displayed to the customer from the images displayed on the salesperson-use display unit 18, and then, displays the remaining images on the customer-use display unit 19. Therefore, if the face image of another person is included in the extracted face images, the salesperson may delete the face image in advance and then, may cause the person to see only the remaining images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above embodiment, the time interval of capturing the image by the camera is 500 ms. However, in order to improve the accuracy of the recognition, the time interval may be shorter.

In addition, in the above embodiment, if all of the parts of the eyes, nose, mouth, and chin stored in the frame storage region 142 match the eyes, nose, mouth, and chin of any persons stored in the specific person storage region 143, the same face flag may be set as "1". Alternatively, even if not all the parts match, the same face flag may be set as "1".

In addition, in the above embodiment, the face image selected by the selection button 185 is displayed on the customer-use display unit 19. Alternatively, the face image not designated by the selection button 185 may also be displayed on the customer-use display unit 19.

The program executed in the SC 1 in the above embodiment is provided by being recorded in a computer-readable recording medium such as a CD-ROM, a flexible disk (FD), a CD-R, or a digital versatile disk (DVD) as an installable or an executable format file.

In addition, the face tracking system may be configured such that the program executed in the SC 1 in the above embodiments is provided by being stored in the computer connected to a network such as the internet and be downloaded via the network. In addition, the face tracking system may be configured such that the program executed in the SC 1 in the above embodiment is provided and distributed via the network such as the internet.

In addition, the face tracking system may be configured such that the program executed in the SC 1 according to the above embodiment is provided by being incorporated in the ROM 12 or the like in advance.

What is claimed is:

1. A face image tracking system for a site, comprising:
    a data storage;
    an imaging device;
    a display; and
    a processor configured to:
        store, in the data storage, face images of persons that were acquired when the persons visited the site,
        tag one or more of the face images stored in the data storage,
        obtain a face image of a person that is captured by the imaging device in response to a request to delete a face image of the person stored in the data storage,
        extract one or more stored face images that have at least a threshold similarity to the face image of the person captured by the imaging device,
        delete one of the extracted face images from the data storage when said one of the extracted face images is not tagged, and
        display, on the display, information indicating that said one of the extracted face images cannot be deleted when said one of the extracted face images is tagged.

2. The face image tracking system according to claim 1, wherein the processor is further configured to:
    determine whether or not a face image of a person has been previously stored in the data storage upon acquisition of a new face image of the person,
    determine face angles of a face in the acquired new face image and the previously stored face image, when it is determined that the face image of the person has been previously stored in the data storage, and
    replace the previously stored face image with the acquired new face image when the face in the acquired new face image is directed more forward than the face in the previously stored face image.

3. The face image tracking system according to claim 2, wherein
    the face image captured by the imaging device is a frontal face image of the person.

4. The face image tracking system according to claim 1, further comprising:
    an operation panel, wherein
    the processor is further configured to display, on the display, a selection screen including the face image captured by the imaging device and the extracted face images, and delete one or more of the extracted face images selected through a user selection on the operation panel.

5. The face image tracking system according to claim 4, further comprising:
a second display; and
a second operation panel, wherein
the processor is further configured to:
    display, on the second display, a confirmation screen including the face image selected through the user selection, and
    delete the face image upon a confirmation operation of the second operation panel.

6. The face image tracking system according to claim 5, wherein
the confirmation screen does not include one or more of the extracted face images that are not selected through the user selection.

7. The face image tracking system according to claim 1, wherein
when no stored face images have the threshold similarity to the captured face image, the processor displays, on the display, information indicating that no stored face images have high similarity to the captured face image.

8. The face image tracking system according to claim 1, wherein
each of the face images stored in the data storage includes face parts images of face parts, and
the processor is further configured to extract face parts images from the captured face image and determine similarity between the stored face images and the captured face image by comparing the stored face parts images and the captured face parts images.

9. A method for operating a face image tracking system for a site, comprising:
storing, in a data storage, face images of persons that were acquired when the persons visited the site;
tagging one or more of the face images stored in the data storage;
capturing a face image of a person when the person requests deletion of a face image of the person stored in the data storage;
determining similarity between each of the stored face images and the captured face image;
extracting one or more stored face images that are determined to have at least a threshold similarity to the captured face image;
executing a deletion process to delete one of the extracted face images from the data storage when said one of the extracted face images is not tagged; and
displaying, on a display, information indicating that said one of the extracted face images cannot be deleted when said one of the extracted face images is tagged.

10. The method according to claim 9, further comprising:
determining whether or not a face image of a person has been previously stored in the data storage upon acquisition of a new face image of the person;
determining face angles of faces in the acquired new face image and the previously stored face image, when it is determined that the face image of the person has been previously stored in the data storage; and
replacing the previously stored face image with the acquired new face image when the face in the acquired new face image is directed more forward than the face in the previously stored face image.

11. The method according to claim 10, wherein the captured face image is a frontal face image of the person.

12. The method according to claim 9, further comprising:
displaying a selection screen including the captured face image and the extracted face images;
receiving a user selection of one or more of the extracted face images, wherein
the face image selected through the user selection is subject to the deletion process.

13. The method according to claim 12, further comprising:
displaying a confirmation screen including the face image selected through the user selection; and
receiving a confirmation operation by the person who requested the deletion of the face image, wherein
the face image is subjected to the deletion process upon the confirmation operation.

14. The method according to claim 13, wherein
the confirmation screen does not include one or more of the extracted face images that are not selected through the user selection.

15. The method according to claim 9, further comprising:
when no stored face images are determined to have the threshold similarity to the captured face image, displaying information indicating that no stored face images have high similarity to the captured face image.

16. The method according to claim 9, wherein each of the face images stored in the data storage includes face parts images of face parts, the method further comprising:
extracting face parts images from the captured face image; and
comparing the stored face parts images and the captured face parts images.

17. The face image tracking system according to claim 1, wherein
the face images of persons who visited the site are acquired by one or more of a plurality of cameras set at the site.

18. The face image tracking system according to claim 1, wherein
the data storage includes a first region in which the acquired face images are stored, a second region in which the one or more tagged face images are stored, and a third region in which the captured face image is stored.

19. The method according to claim 9, wherein
the face images of persons who visited the site are acquired by one or more of a plurality of cameras set at the site.

20. The method according to claim 9, wherein
the data storage includes a first region in which the acquired face images are stored, a second region in which the one or more tagged face images are stored, and a third region in which the captured face image is stored.

* * * * *